3,395,206
PROCESS FOR PRODUCING A FOUNDRY
PATTERN
Hans Schneider, Winterthur, Switzerland, assignor to
Sulzer Brothers Limited, Winterthur, Switzerland,
a Swiss company
No Drawing. Filed Mar. 3, 1965, Ser. No. 436,952
Claims priority, application Switzerland, Mar. 12, 1964,
3,190/64
20 Claims. (Cl. 264—225)

ABSTRACT OF THE DISCLOSURE

A foundry mold pattern capable of being destroyed in situ in a foundry mold surrounding the pattern is prepared by initially mixing a particulate water soluble crystalline substance such as urea, adipic acid, a lactam or a water-soluble salt with a particulate thermoplastic binder material such as polyvinyl alcohol to form a pattern-forming mixture. The temperature at which the thermoplastic binder material commences to soften is below the melting temperature of the crystalline substance of the pattern-forming mixture. The pattern-forming mixture is heated to a temperature above that at which the thermoplastic material commences to soften and below the melting temperature of the crystalline substance. The thus heated pattern-forming mixture is introduced into the mold cavity of a master mold under sufficient pressure to insure that the mixture completely fills the cavity. Thereafter, the resulting mold is cooled and is removed from the master mold.

---

This invention relates to a process for producing a foundry pattern that can be destroyed in situ in a mold, the pattern being made from a crystalline water-soluble substance in powder form.

Patterns that can be removed from a mold surrounding the pattern by destroying the pattern in situ in the mold are used mainly for the production of precision castings or investment castings. The precision casting process generally comprises making a pattern of the required casting, possibly together with the downgates, from a material that can be melted or burned, for example from wax or a thermoplastic, and then covering the pattern with a refractory material to form the foundry mold. The mold is then dried and fired, for example, in a furnace, whereupon the pattern within the mold is destroyed by being melted out and/or burned. Molten metal is then poured into the mold cavity thus formed in the mold.

Apart from the advantage of easy plasticity in the hot state, waxes and plastics have very marked disadvantages for use as a pattern material. During period of exposure to elevated room temperature patterns of such materials are not very stable and have poor dimensional stability because the pattern material creeps. In some cases the pattern changes shape during actual cooling in the master mold used to form the pattern and during setting after removal from the master mold. These effects are due to the amorphous structure of waxes and plastics. Moreover, internal stresses in a wax or plastic pattern on the heating of the foundry mold for melting out or burning the pattern may cause deformation of the pattern with resultant cracks in the mold surrounding the pattern. If wax or plastic patterns are destroyed by being dissolved out of the foundry mold, relatively expensive solvents are required.

For these reasons urea has been proposed for use as a pattern material. In the solid state it has a crystalline structure and is therefore distinguished by very good dimensional stability even at elevated room temperatures. Also, urea is water-soluble so that patterns made of urea can very advantageously be removed from the foundry mold by being dissolved in water and flushed out of the mold, since water is by far less expensive than the organic solvents such as trichloroethylene that must be used to dissolve wax patterns. To improve the strength properties of urea patterns it has also been proposed that a suitable quantity of polyvinyl alcohol be added to the urea as a plasticiser, for example in an amount of up to 10% by weight.

Urea patterns has also been used as cores for forming cavities in wax patterns. The urea core is placed in a mold and the cavity still left in the mold is then filled with wax or some other thermoplastic material. The resultant pattern is then placed in water so that the urea core of the pattern is dissolved.

In all of the aforementioned instances the urea has been formed into a pattern by being cast in the molten state. Urea melts at about 132° C., so that patterns can be made in conventional injection molding machines with low pressures. Salts have also been proposed as materials for the cores of wax patterns and, for example, are made by being crystallised out of hot, supersaturated solutions of the salt.

In the above-described processes employing crystalline pattern materials there are serious disadvantages to offset the advantages resulting from the use of the crystalline materials. Molten urea which has solidified in a mold cavity forms relatively large single crystals which very undesirably reduce the strength of the pattern. In particular, there is a considerable brittleness so that the patterns have to be handled with very great care to protect sharp edges and thin parts from damage. As previously mentioned an attempt can be made to obviate this disadvantage by the addition of a plasticiser to the urea. However, as the plasticiser softening temperature differs from the urea melting temperature, it is impossible to obtain a homogeneous mixture so that the desired strength improvement cannot be uniformly obtained in all parts of the pattern.

Also, as the processing temperatures are above melting temperature of urea, urea forms the compound biuret with evolution of ammonia, which in many cases is responsible for an unclean surface of the pattern. Biuret is also much more difficult to dissolve in water than urea.

A further serious disadvantage in the processing of crystalline pattern materials in the molten form is that the pattern material shrinks on cooling in the injection mold used. Particularly in the case of complicated patterns with undercut portions and with drawable cores, the pattern material may shrink to such an extent that the solidified pattern becomes very difficult to remove from the mold, and in some cases it is impossible to remove the pattern from the mold without damage to the pattern.

I have now discovered a new process for making destructible foundry patterns which enables these disadvantages to be extensively obviated. The process of my invention is characterised in that the pattern is formed from a mixture of a particulate water-soluble crystalline substance with a particulate thermoplastic binder. The mixture is introduced into the mold cavity of a master mold at temperatures below the melting temperature of the crystalline substance under sufficient pressure to insure that the mixture completely fills the mold cavity. The thus-formed pattern is then cooled, and when cool is removed from the master mold for subsequent use in making a foundry mold.

Patterns produced by the process according to the invention are distinguished by the accurately predetermined particle size of the crystalline substance; this particle size of the powder constituent can be so selected as to exclude any harmful brittleness of the pattern from the very outset. Separation of the mixture of crystalline substance and binder cannot occur since the powder mixture is processed below the melting temperature of the crystalline substance. As a result, the binding action of the thermoplastic material is distributed uniformly throughout the cross-section of the resultant pattern.

It is also a very important feature of my new pattern-making process that no adverse shrinkage of the pattern material can occur during its processing below the melting temperature of the crystalline substance. Because of the high accuracy of their external dimensions and of their increased strength, patterns made by the process according to the invention can easily be removed from the master mold used to form the pattern.

Urea is a particularly advantageous water-soluble crystalline substance for use in my process. Other suitable substances are adipic acid, lactams, such as caprolactam, and water-soluble salts, for example ammonium formate. Thermoplastic materials suitable for use as the binder in my process include higher polyhydric alcohols, and their esters and ethers; for example, polyvinyl alcohol, polyglycol, polyalkylene oxides or glycerin oxyalkyl ether, are suitable as binders. Another suitable group of binder materials comprises esters of mono- and poly-carboxylic acids; for example, phthalic acid and glycolic acid esters. Epoxy stearic acid ethyl ester also has a good binder effect for the crystalline substance. Most of the said substances also act as plasticisers and thus facilitate processing on the plastics press. The principal requirement of the binder material is that it commence to soften or become plastic at a temperature below the melting temperature of the crystalline substance.

Processing temperatures ranging between 40° C. and 120° C. are advisable for pattern materials which contain urea as the crystalline substance. The pressure required to force the pattern-forming mixture into the mold cavity of the master mold changes inversely with the processing temperature; for example, a processing temperature of 40° C. for a urea-containing mixture requires a processing pressure of about 250 kg. per sq. cm., whereas a processing temperature of 120° C. requires a processing pressure of only about 50 kg. per sq. cm. Pattern materials containing adipic acid as the crystalline substance are advantageously processed at temperatures below 150° C., lactams are processed below 200° C. and ammonium formate is processed below 100° C.

The process according to the invention is explained in detail hereinafter with reference to the following examples.

Example 1

Ninety-two parts by weight of finely ground urea having a particle size of less than 0.5 mm. were mixed with 8 parts by weight of pulverulent polyvinyl alcohol which also had a maximum particle size of less than 0.5 mm.

The powder mixture was introduced into the cylinder of a plastic press, in which it was heated to 95° C. This temperature is below the melting point of urea but is sufficient to produce a certain softening of the polyvinyl alcohol. The urea and polyvinyl alcohol mixture was pressed at a pressure of 150 kg. per sq. cm. into a conventional master mold for forming the pattern. The formed pattern was readily removed from the mold after the mold top had been removed. The pattern had a very good surface quality; sharp edges and undercut portions were exactly reproduced. The resultant pattern was so stable that even after standing at elevated room temperatures it could be refitted without any clearance whatever into the mold used to form it.

Example 2

Ninety-four parts by weight of adipic acid in powder form having a particle size of less than 0.3 mm. were mixed with 6 parts by weight of pulverulent epoxy stearic acid ethyl ester and processed to form the required patterns in a plastic press at a temperature of 130° C. and a pressure of 75 kg. per sq. cm. The resultant patterns had very good surface quality and adequate strength; fine parts of the pattern were reproduced with complete fidelity as regards dimensions. The patterns were distinguished by very good stability and were practically free from any shrinkage.

The invention is not limited to the above-described examples; any combination of the said crystalline substances and the substances indicated to be suitable as binders may be used.

I claim:

1. Process for producing a foundry mold pattern capable of being destroyed in situ in a foundry mold surrounding the pattern which comprises admixing a particulate water-soluble crystalline substance and a particulate thermoplastic binder material to form a pattern-forming mixture, the temperature at which the thermoplastic binder material commences to soften being below the melting temperature of the crystalline substance of said pattern-forming mixture, heating said pattern-forming mixture to a temperature above that at which the thermoplastic material commences to soften and below the melting temperature of the crystalline substance, introducing the heated pattern-forming mixture into the mold cavity of a master mold under sufficient pressure to insure that the mixture completely fills the cavity, thereafter cooling and removing the resulting molded pattern from the master mold.

2. The process according to claim 1 in which the crystalline water-soluble substance is selected from at least one of the group consisting of urea, adipic acid, lactams and water-soluble salts.

3. The process according to claim 1 in which the thermoplastic binder material is selected from at least one of the group consisting of higher polyhydric alcohols, esters of higher polyhydric alcohols, ethers of higher polyhydric alcohols, esters of mono- and poly-carboxylic acids, and epoxy stearic acid ethyl ester.

4. The process according to claim 1 in which the particle size of substantially all of the crystalline substance is less than about 0.5 mm.

5. The process according to claim 1 in which the crystalline substance comprises the major portion of the pattern-forming mixture.

6. Process for producing a foundry mold pattern capable of being destroyed in situ in a foundry mold surrounding the pattern which comprises forming a pattern-forming mixture of a finely divided water-soluble crystalline substance with a minor amount of a particulate thermoplastic binder material, the crystalline substance being selected from at least one of the group consisting of urea, adipic acid, lactams and water-soluble salts, and the thermoplastic binder material being one which commences to soften at a temperature below the melting temperature of the crystalline substance, heating said pattern-forming mixture to a temperature above that at which the thermoplastic material commences to soften and below the melting temperature of the crystalline substance, introducing the heated pattern-forming mixture into the mold cavity of the master mold under sufficient pressure to insure that the mixture completely fills the cavity, cooling the thus molded pattern-forming mixture to below the softening temperature of the thermoplastic binder, and removing the resulting molded pattern from the master mold.

7. The process according to claim 6 in which the thermoplastic binder material is selected from at least one of the group consisting of higher polyhydric alcohols, esters of higher polyhydric alcohols, ethers of higher polyhydric alcohols, esters of mono- and poly-carboxylic acids, and epoxy stearic acid ethyl ester.

8. The process according to claim 6 in which the thermoplastic binder material is selected from at least one of the group consisting of polyvinyl alcohol, polyglycol, polyalkylene oxide and glycerin oxyalkyl ether.

9. The process according to claim 6 in which the thermoplastic binder material is selected from the group consisting of phthalic acid esters and glycolic acid esters.

10. The process according to claim 6 in which the crystalline substance is urea.

11. The process according to claim 6 in which the crystalline substance comprises between about 80 to 97% by weight of the pattern-forming mixture.

12. The process according to claim 6 in which the particle size of substantially all of the crystalline substance is less than about 0.5 mm.

13. Process for producing a foundry mold pattern capable of being destroyed in situ in a foundry mold surrounding the pattern which comprises forming a pattern-forming mixture of a finely divided water-soluble crystalline substance with a minor amount of a particulate thermoplastic binder material, the thermoplastic binder material being selected from at least one of the group consisting of higher polyhydric alcohols, esters of higher polyhydric alcohols, ethers of higher polyhydric alcohols, esters of mono- and poly-carboxylic acids, and epoxy stearic acid ethyl ester, said thermoplastic binder material having a softening temperature below the melting temperature of the crystalline substance, heating said pattern-forming mixture to a temperature above that at which the thermoplastic material commences to soften and below the melting temperature of the crystalline substance, introducing the heated pattern-forming mixture into the mold cavity of a master mold under sufficient pressure to insure that the mixture completely fills the cavity, cooling the thus molded pattern-forming mixture to below the softening temperature of the thermoplastic binder, and removing the resulting molded pattern from the master mold.

14. The process according to claim 13 in which the crystalline water-soluble substance is selected from at least one of the group consisting of urea, adipic acid, lactams and water-soluble salts.

15. The process according to claim 13 in which the crystalline substance is urea.

16. The process according to claim 13 in which the crystalline substance is adipic acid.

17. The process according to claim 13 in which the crystalline substance is caprolactam.

18. The process according to claim 13 in which the crystalline substance is ammonium formate.

19. The process according to claim 13 in which the crystalline substance comprises between about 80 to 97% by weight of the pattern-forming mixture.

20. The process according to claim 13 in which the particle size of substantially all of the crystalline substance is less than about 0.5 mm.

No references cited.

JAMES A. SEIDLECK, *Primary Examiner.*

J. R. THURLOW, *Assistant Examiner.*